SOLID STATE, THIN FILM TRIODE WITH A GRADED ENERGY BAND GAP

Filed June 12, 1963

3 Sheets-Sheet 1

INVENTOR.
LINCOLN W. HERSHINGER

BY

Robert D. Sanborn

ATTORNEY

INVENTOR.
LINCOLN W. HERSHINGER
BY
Robert D. Sanborn
ATTORNEY

SOLID STATE, THIN FILM TRIODE WITH A GRADED ENERGY BAND GAP

Filed June 12, 1963

3 Sheets-Sheet 3

INVENTOR.
LINCOLN W. HERSHINGER
BY
Robert D. Sanborn
ATTORNEY

United States Patent Office 3,290,568
Patented Dec. 6, 1966

3,290,568
SOLID STATE, THIN FILM TRIODE WITH A GRADED ENERGY BAND GAP

Lincoln W. Hershinger, Oreland, Pa., assignor to Philco Corporation, Philadelphia, Pa., a corporation of Delaware Filed June 12, 1963, Ser. No. 287,248
9 Claims. (Cl. 317—235)

The present invention relates to solid state electron devices and more particularly to improvements in thin film solid state electron devices.

Solid state electron devices having transistor like properties have been proposed using emitter, base and collector electrodes of metal, the base and emitter electrodes and the base and collector electrodes being separated by a suitable layer of thin insulating material. The thickness of the base electrode is made less than a mean free path of an electron in the base metal so that a large fraction of the electrons injected into the base pass completely through it without collision and are attracted to the collector electrode by the electric field which exists between base and collector.

Diode devices equivalent to the emitter electrode, the thin film base electrode and the separating insulating layer are also useful as a source of electrons, i.e. the cathode, in an otherwise conventional vacuum tube. As will be exaplained in more detail presently the diode structure is also useful in conventional diode, photodiode and in voltage variable capacitor applications.

Heretofore it has been proposed to employ the tunneling effect first exploited by Esaki in the tunnel diode to achieve injection of electrons into the thin film base region. One form of tunneling emitter involves two layers of metal separated by a thin insulator. The insulator is made thin compared to the mean free path of an electron in the insulator. This precludes breakdown of the insulator by the avalanche process. The materials are chosen so that ionic disruption of the structure will not occur even though the electric fields are strong enough to cause tunneling. Ordinarily the insulator is composed of the oxide of one of the metal layers and can be formed by anodization or thermal oxidation. This approach has several disadvantages stemming generally from the requirement of very high fields in the extremely thin insulator.

An alternative approach is thermionic injection, i.e. the thermal excitation of electrons over a barrier into the metal base rather than the tunneling of electrons through a thin barrier. The main difficulty with the prior art approach to thermal injection is the lack of suitable barrier materials.

In addition to the problems which exist in known schemes for emitting electrons, serious problems also exist in collection schemes. Typically collection in a thin film device is accomplished with a metal-insulator-metal sandwich somewhat similar to the tunnel emitter described above. In general these insulators are thicker than those of the emitter but are kept thin enough to circumvent space charge effects. A collection voltage is applied between the two metal layers (one of which is the thin base associated with the emitter). This collection voltage is high enough to insure that electrons injected through the base layer are swept through the insulator to the collector but low enough so that breakdown and multiplication effects are avoided. Such collectors are useful but in general leave much to be desired in terms of barrier height values—they are ordinarily higher than desired.

A metal-semiconductor surface barrier as taught and claimed in the copending application of Ruth F. Schwarz and James P. Spratt, Serial No. 94,902, filed March 10, 1961 is an excellent collector device. However in a collector device of this type the barrier has a height determined by the semiconductor employed. Since the number of useful semiconductors is limited the selection of available barrier heights is likewise limited.

Therefore it is an object of the present invention to provide an improved thin film, solid state electron device.

More particularly it is an object to provide a solid state electron device having controlled barrier heights.

An additional object of the invention is to provide means for controlling the properties of seminconductor films in diode and triode solid state devices.

In general these and other objects of the invention are achieved by employing two metal electrodes separated by a semiconducting film or layer which has an energy band gap that is a continuous function of the distance from one of the electrodes.

For a better understanding of the present invention together with other and further objects thereof reference should now be had to the following detailed description which is to be read in conjunction with the accompanying drawing in which.

Figure 1:
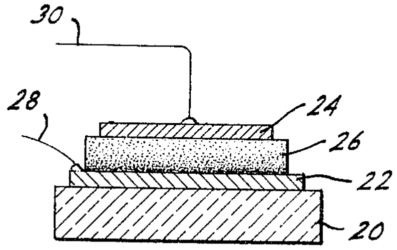
FIG. 1 is a cross-sectional view of a diode embodiment of the invention.
Figure 2:
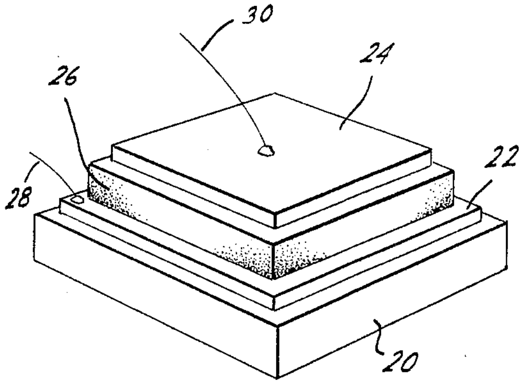
FIG. 2 is a perspective view of the embodiment of FIG. 1.

The diode embodiment of the invention shown in FIGS. 1 and 2 is formed on a substrate 20 the primary function of which is mechanical support for the solid state structure. Substrate 20 is represented in FIGS. 1 and 2 as being formed of glass but this is by way of example only and conductive substrates as well as other non-conductive substrates may be employed. Electrodes 22 and 24 may be formed of any suitable electrode material such as chromium, indium, gold or platinum. As will be explained in greater detail presently, applicant's novel semiconducting layer 26 which separates electrodes 22 and 24 permits a wide choice of electrode material. The semiconducting material of layer 26 is characterized by having a different energy band gap at electrode 22 than at electrode 24, the band gap at any point within the layer 26 being a continuous function of the distance of that point from electrode 22. The energy band gap referred to herein is the gap between the upper energy level of the valence band and the lower energy level of the conduction band in the material. For example, layer 26 may be formed of a substitutional solid solution of zinc-cadmium sulfide in which the percentage of zinc sulfide in the layer varies as a continuous function of the distance from electrode 22. Leads 28 and 30 which are soldered or otherwise electrically and mechanically connected to electrodes 22 and 24 provide suitable means for connecting the diode to an external circuit. If several circuit components are constructed on a single substrate one or both of the electrodes 22 and 24 may be extended laterally to form an electrode of another circuit element. Alternatively another circuit element, for example a capacitor, may be formed on top of the one shown in FIGS. 1 and 2 using electrode 24 as one electrode of the other circuit element. In such cases one or both of the leads 28 and 30 may be omitted.

A diode of the type shown in FIGS. 1 and 2 and having a different energy band gap at different points within the layer 26 may be formed by the successive vacuum deposition of a metal layer 22 onto substrate 20; a zinc-cadmium sulfide layer 26 onto metal layer 22 and a second metal layer 24 onto layer 26. Zinc-cadmium sulfide is presently preferred for layer 26 since it is readily evaporated and provides suitable barrier heights. By using separate sources of zinc sulfide and cadmium sulfide in the deposition of layer 26 the relative percentages of these two materials may be made to vary in a controlled manner throughout the layer.

The vacuum deposition of zinc-cadmium sulfide films is known in the art and need not be described in detail. However as an aid to the better understanding of the descriptive material which follows, a brief description will be given with reference to FIG. 6 of one preferred method of forming layer 26.

Figure 6:
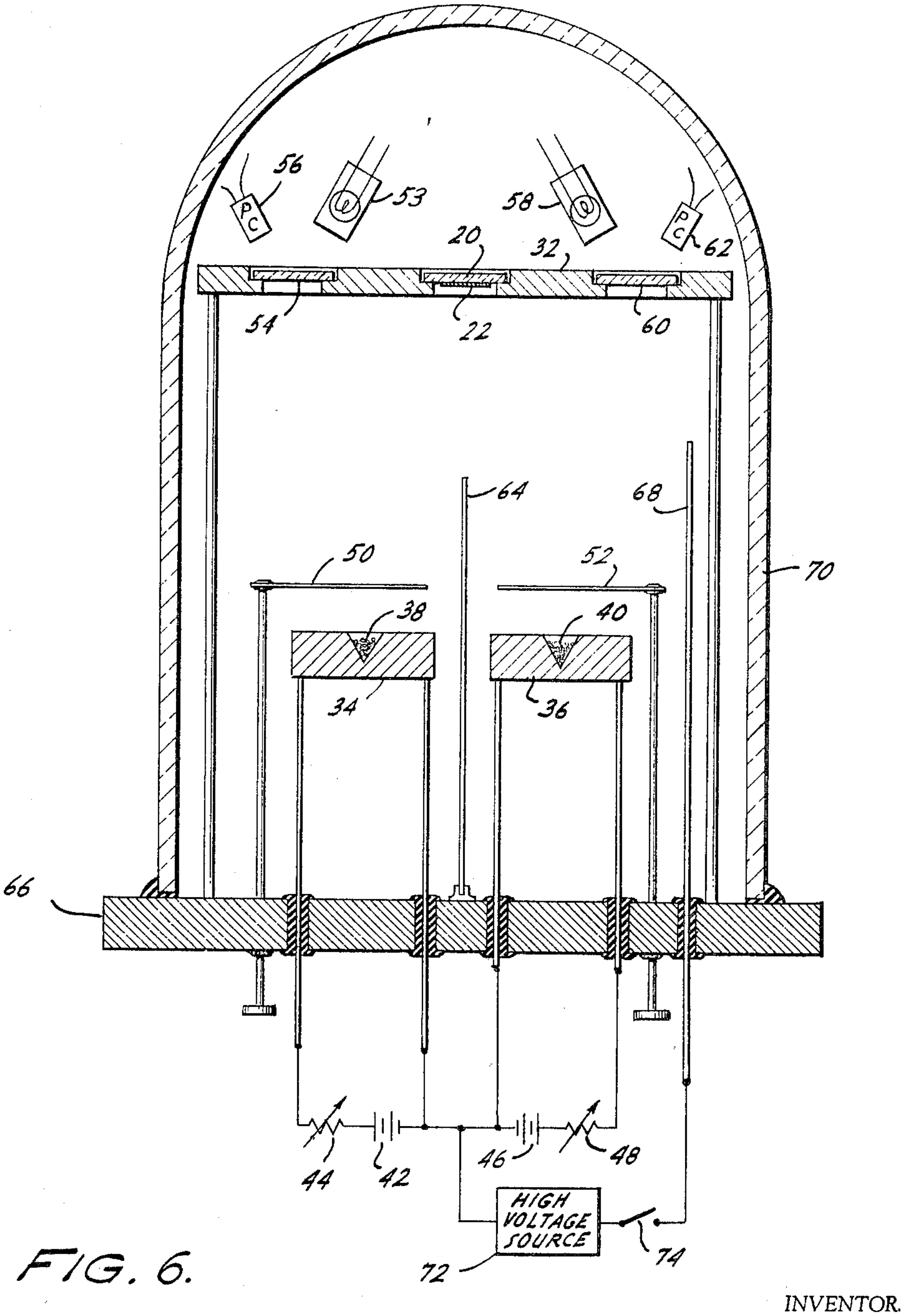
FIG. 6 is a sectional view showing apparatus for forming the semiconducting layer of the present invention.

In FIG. 6 the substrate 20 having electrode 22 previously formed thereon is placed in a rack or holder 32 with electrode 22 facing two electrically heated boats 34 and 36 containing zinc sulfide 38 and cadmium sulfide 40. The zinc sulfide and cadmium sulfide are preferably in the form of pellets or uniformly sized chunks rather than powder to insure uniform evaporation without spattering. Battery 42 and variable resistor 48 represent schematically means for providing controlled heating of the electrically conductive boat 36. Mechanically controlled shutters 50 and 52 provide means for preventing material from boats 34 and 36 from reaching substrate 20 during the outgassing or preliminary heating of boats 34 and 36 and the material contained therein. A third shutter (not shown) may be provided for covering substrate 20 only while the proper rate of evaporation from boats 34 and 36 is being established and measured.

A light source 53, a glass substrate 54 and photocell 56 provide means for measuring the rate of deposition of the zinc sulfide evaporated from boat 34 on substrate 54 and hence the rate of deposition of this material on correspondingly placed substrate 20. Light source 58, substrate 60 and photocell 62 provide equivalent means for monitoring the rate of deposition of cadmium sulfide evaporated from boat 36. A partition 64 shadows substrate 60 from the material evaporated from boat 34 and substrate 54 from the material evaporated from boat 36. Thus the rate of deposition of the two materials may be monitored separately. It is to be understood that partition 64 does not shadow substrate 20 from either material 38 and 40. The electrical leads to the light sources 53 and 58 and photocells 56 and 62 are not shown in FIG. 6 in order to simplify the drawing. In practice they would extend through a suitable insulator located in metal baseplate 66 to external power sources and monitors.

An electrode 68 provides means for establishing a glow discharge within the enclosing bell jar 70. High voltage source 72 and switch 74 schematically represent means for supplying the necessary potential to electrode 68 to establish the glow discharge.

The layer 26 may be applied to substrate 20 over electrode 22 as follows. With shutters 50 and 52 shielding substrates 20, 54 and 60 the space within the bell jar 70 is evacuated and boats 34 and 36 are heated to just below the evaporation point to outgas the zinc sulfide 38 and the cadmium sulfide 40. The heating of boats 34 and 36 is then interrupted while argon gas at a pressure of approximately 20 Torr is introduced into bell jar 70. A high voltage is supplied to electrode 68 from source 72 by closing switch 74. The resulting glow discharge cleans and prepares the surfaces of substrates 54 and 60 and electrode 22 to receive the sulfide film.

Following the glow discharge step the bell jar 70 is evacuated to a pressure of about $10^{-6}$ Torr. Boats 34 and 36 are then heated to temperatures which will provide the desired rate of deposition of the zinc sulfide and the cadmium sulfide. The shutters 50 and 52 (or the shutter shielding substrate 20 only, if present) are then moved to permit evaporated material to impinge and condense on substrate 54 and 60 and electrode 22 on substrate 20. It has been found that a film thickness for layer 26 of approximately 0.5 micron deposited at a rate of approximately one micron per hour gives satisfactory performance. It has been found that vacuum baking the deposited film for about 12 minutes at a temperature of approximately 350° C. improves the properties of the film. The electrode 24 may be added to layer 26 by a second vacuum deposition step. It is to be understood that the size and shape of the layer 26 and electrode 24 may be controlled by masking during the deposition step or by photolithographically controlled selective etching after deposition. It is to be understood that the apparatus and process described is given only by way of example and that the invention is not to be limited thereby.

As explained above, the relative percentages of zinc sulfide and cadmium sulfide vary throughout layer 26 as a function of the distance from electrode 22. This can be accomplished by controlling the heating current supplied to boats 34 and 36 by means schematically represented by resistors 44 and 46, thereby to control the relative temperatures of boats 34 and 36.

It has been found in practice that highly satisfactory diode performance is achieved if the composition of the layer varies from substantially 100% cadmium sulfide at one of the electrodes to approximately 70% to 95% cadmium sulfide at the other electrode. However the specific percentages employed as well as the rate of variation in percentages as a function of position within the layer will vary with electrode material employed, the desired current-voltage characteristic of the diode and the circuit function of the diode. As will be explained in more detail presently, varying the relative percentages of the two materials will vary the energy band gaps and hence the barrier heights at the two surfaces of the layer 26 as well as the rate of variation of this band gap within the layer.

Figure 3:
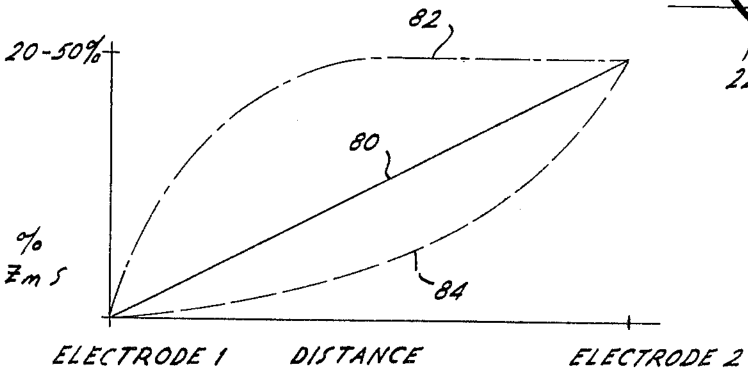
FIG. 3 is a composition diagram of the semiconductor layer of the embodiment of FIG. 1.

The variation in the percentage of zinc sulfide need not be a linear function of the distance from electrode 22 as shown by curve 80 of FIG. 3 but may vary in the manner represented by curves 82 and 84, for example (or along any other selected curve), to optimize the properties of the diode for various circuit applications such as its use as a variable capacitor, a photodiode or as a source of hot electrons in a vacuum tube. A "hot electron" is an electron having higher energy than is typical of electrons in random thermal motion within a material. However the variation is preferably a substantially continuous function of distance from electrode 22 so that there are no abrupt discontinuities within the layer. It has been found by electrical and optical analysis that the film formed in the manner described above is a substitutional solid solution which has an energy band gap at any point within the layer which is determined by the composition at that point and hence is a continuous function of the distance from either surface. The zinc-cadmium sulfide may be described also as a ternary II–VI alloy since it includes three elements, two of which are found in column II of the periodic table and one in column VI of the periodic table.

Figure 4:
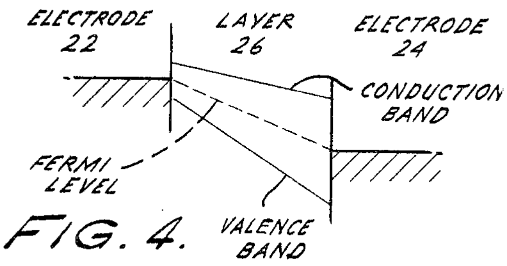
FIGS. 4 and 5 are energy diagrams of different diode embodiments of the invention.
Figure 5:
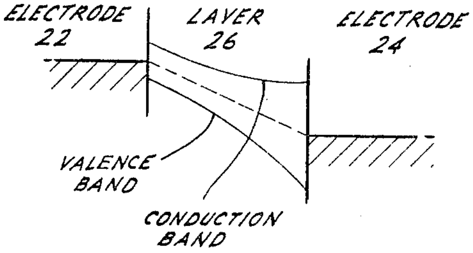

FIGS. 4 and 5 are energy diagrams which represent the variations in the energy band gaps within layer 26 for variations in the composition of the layer. The energy diagram of FIG. 4 corresponds to a composition of the type represented by the curve 80 of FIG. 3 while the energy diagram of FIG. 5 corresponds to a composition of the type represented by the curve 84.

It will be obvious to those skilled in the art from a study of FIGURE 4 that the variation in the energy band gap at the two electrodes 22 and 24 will result in different barrier heights even though electrodes 22 and 24 are formed of the same metal. Thus a device formed of two gold electrodes with a graded zinc-cadmium sulfide intermediate layer will exhibit asymmetric conductive properties. In most instances the asymmetric conducting properties may be improved by employing dissimilar materials for the two electrodes. For example a low work function material such as indium may be employed adjacent the surface of layer 26 exhibiting the low band gap and a high work function material such as gold may be employed at the high band-gap surface of the layer 26. One very important advantage of employing zinc cadmium sulfide in accordance with the presently preferred embodiment of the invention is that the width of the band gap may be varied readily to provide optimum characteristics with any given pair of electrodes.

Figure 7:
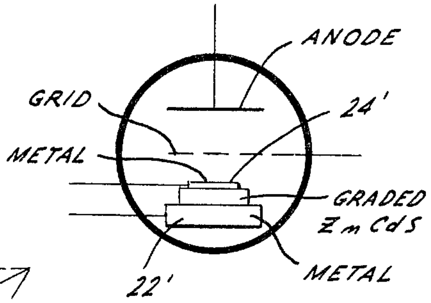
FIG. 7 is a diagrammatic showing of one application of the diode embodiment of the invention.

FIG. 7 shows diagrammatically the use of the diode embodiment of the present invention as the cathode element of a triode vacuum tube. The electrode 22', which corresponds to electrode 22 of FIG. 1, may be made thick enough to support layer 26, thus making it unnecessary to provide a separate substrate. The electrode 24', which corresponds to electrode 24 of FIG. 1, is made substantially transparent to hot electrons so that a large fraction of the electrons injected into electrode 24' pass completely through it to form the electron stream of the vacuum tube. In general layer 24' may be made substantially transparent to hot electrons by making the thickness of the layer substantially less than the mean free path of the electrons in the metal. By way of example electrode 24' may be a film gold having a thickness of the order of 100 A. The exposed surface of electrode 24' may be treated with a low work function metal to increase the number of electrons escaping from the surface of electrode 24'.

Figures 8, 9, 11, 12:
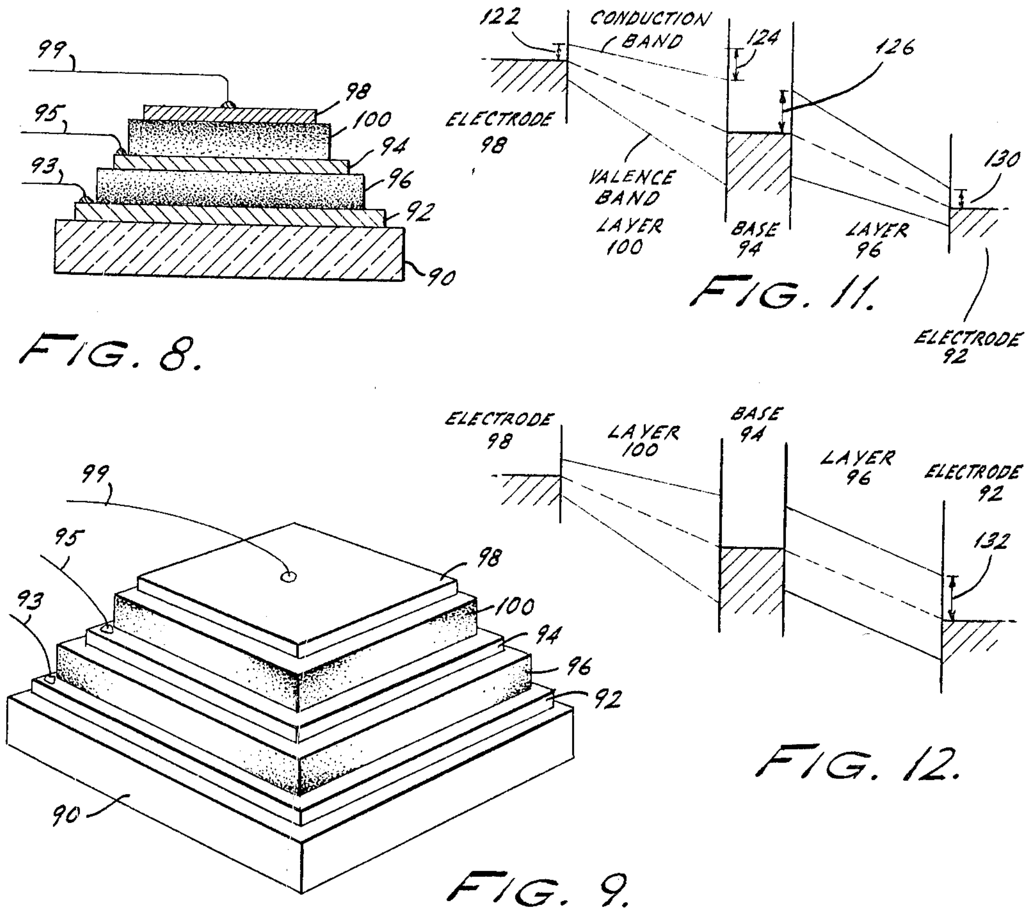
FIGS. 8 and 9 are cross-sectional and perspective views, respectively, of a triode embodiment of the invention.
FIGS. 11 and 12 are energy diagrams relating to the embodiment of FIGS. 8 and 9.

FIGS. 8 and 9 illustrate a triode embodiment of the invention.

Again, substrate 90 is primarily for mechanical support and may be omitted if electrode 92 is thick enough to be self supporting. Electrodes 92, 94 and 98 are of metal. Leads 93, 95 and 99 represent diagrammatically suitable means for making electrical connections from electrodes 92, 94 and 98 to external circuits. Layers 96 and 100 are formed of a material having a controllable energy band gap such as zinc-cadmium sulfide. Triode elements of the type shown are sometimes referred to as "metal base transistors." They are generally equivalent to NPN transistors and may be connected into a circuit in a similar manner. However, unlike NPN transistors the base-collector voltage may be less than the base-emitter voltage. Electrode 94, which corresponds to the base electrode of a transistor, should have a thickness less than a mean free path in the metal for the reasons stated in the description of FIG. 7. While the amplifying device described herein is thought to operate on the principle of hot electrons passing through a metal base thin compared to a mean free path of an electron in the metal, other mechanisms may be responsible for the active behavior. The exact nature of the gain mechanism is not important because my novel barrier forming structure can be applied to many structures. For example, in the Metal Edge Amplifier taught and claimed in the copending application of Ruth F. Schwarz and James P. Spratt, Serial No. 155,726, filed November 29, 1961, my novel structures could be used to advantage in the generation and collection of carriers.

In another embodiment an amplifying structure is created by injecting carriers past a metal mesh or line structure which acts as a control grid in allowing carriers to pass. In this device the metal base shown in FIGURES 8 and 9 would be replaced by a mesh, a series of fine lines joined on at least one edge or the metal base could be made deliberately highly perforate. The remainder of the structure as shown in FIGURES 8 and 9 would remain as shown. Electrode 92 may comprise either the collector electrode or the emitter electrode. If electrode 92 is to be the collector electrode the composition of layer 96 need not be graded, that is there may be a constant percentage of zinc sulfide and cadmium sulfide through the layer. However the percentage of each constituent of the substitutional solid solution is preferably selected to provide the optimum barrier height at electrode 92. Alternatively the composition of layer 96 may be graded as in the diode embodiment of FIG. 1.

Assuming electrode 98 is to function as the emitter electrode of the device, it is preferably formed of a low work function metal such as indium. Layer 100 comprises a graded zinc-cadmium sulfide film of the type shown in FIG. 1, having a maximum percentage of cadmium sulfide adjacent electrode 98. Film 100 may be deposited in the same manner as film 26. If heat treatment of film 100 is employed it should be controlled so as not to affect adversely the previously deposited thin base layer 94. Vacuum baking for a period of 4 minutes at a temperature of approximately 350° C. has been found to be satisfactory. By way of example layers 96 and 100 may have a thickness of approximately ½ micron each but the invention is not limited to layers of this thickness.

Figure 10:
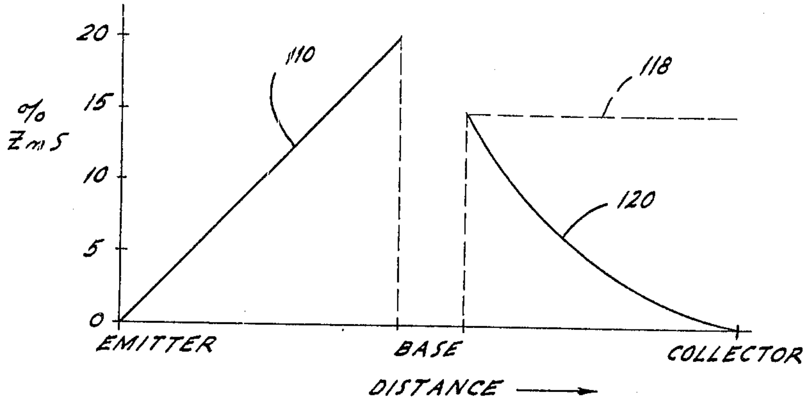
FIG. 10 is a composition diagram of the triode structure of FIG. 8.

The variations in the percentage of zinc sulfide in the composite films 96 and 100 are shown in graphic form in FIG. 10. While the percentage of only the zinc sulfide is shown in FIG. 10 it is to be understood that the balance is cadmium sulfide.

In one preferred embodiment of the invention it was found that a substantially linear variation in the percentage of zinc sulfide from zero percent at an indium emitter electrode 98 to approximately 20% at the 100 A. gold electrode 94 as shown by curve 110 gave satisfactory results. However it is to be understood that it lies within the scope of the invention to employ variations in compositions which follow any continuous curve between the initial value and the final value. Similarly the percentage of zinc sulfide in the layer between the base and collector may be constant as represented by broken line 118 or variant as represented by solid line 120.

FIG. 11 is an energy diagram of a triode device having layers 96 and 100 which follow characteristics similar to curves 110 and 120 in FIG. 10.

The low barrier height 122 at electrode 98 will permit thermally excited electrons in electrode 98 to surmount the barrier and pass into layer 100. The electrons in layer 100 are attracted to base electrode 94 by the field existing in layer 100 due to the potential gradient 124.

As presently understood, since the thickness of base 94 is less than a mean free path of an electron therein a substantial number of the electrons injected therein pass completely through the base without collision. Since the energy of these electrons exceed the height of the barrier 126 they will enter layer 96. Again the electrons in layer 96 are attracted to electrode 92 by the potential gradient between base 94 and electrode 92.

As explained above, the low barrier height 122 at electrode 98 permits the electrons to surmount the barrier by thermal excitation and there is no need to rely on high field tunneling effects. The substantially higher barrier at the interface of layer 100 and base electrode 94 provides a means for selectively preventing the flow of carriers from the base electrode back to the emitter. For the device shown the barriers plus the electric field are such that electrons can readily flow from emitter to base but it is very difficult for a hole to flow from base to emitter. Thus the current is limited to only those carriers that will contribute to useful gain.

The composition of layer 96 may be varied so that the barrier height 126 at base 94 is substantially different from the barrier height 130 at electrode 92. This has the advantage of making it easier for carriers to flow from base to collector for a given value of applied voltage and may contribute to collection efficiency, particularly for thick layers.

FIG. 12 is an energy diagram similar to FIG. 11 for the embodiment of the invention in which the composition of layer 96 between the base electrode 94 and the collector electrode 92 is constant as represented by curve 118 in FIG. 10. The barrier height 132 may be set at the level which will give optimum collector efficiency by appropriate selection of the composition of layer 96, e.g. by appropriate selection of the percentages of zinc sulfide and cadmium sulfide. Prior to the present invention the selection of barrier heights at electrode 92 was limited to those provided by the selectively few available semiconductors.

As pointed out earlier the collector barrier height should be high enough to prevent thermal electrons in the base metal from being collected yet low enough so that the electrons injected by the emitter can easily surmount it.

As explained above, zinc-cadmium sulfide is at present preferred for the semiconducting layers 26, 96 and 100 because they are relatively easily evaporated and the relative percentages can be controlled readily to control such characteristics as energy band gap and effective diode capacitance as a function of applied voltage. Furthermore zinc sulfide and cadmium sulfide are commercially available in high purity form, for example phosphor grade, and they are non-toxic. However other materials which provide the desired variation in the energy band gap may be employed as well. Certain of the oxides, selenides and tellurides of zinc, cadmium, strontium and mercury and mixtures thereof are believed to possess suitable characteristics. The grading of the composition of the zinc-cadmium sulfide to control the energy band gap may be combined with other techniques such as copper doping of the layer separating base and emitter electrodes to control the resistivity of the film.

Since the entire metal base transistor structure may have a thickness of the order of 1 micron it is relatively unaffected by radiation. The structure is also ideally suited to the fabrication of miniaturized as well as conventional sized integrated circuits including capacitors and resistors by successive deposition of appropriate films on a substrate. As noted above, the variation of effective diode capacitance of a diode formed with a zinc-cadmium sulfide film as a function of applied voltage makes the diode embodiment ideally suited for voltage variable capacitor applications. Also the spectral response characteristic of a photodiode may be controlled by controlling the composition of the zinc-cadmium sulfide film separating the two electrodes of the photodiode. Therefore while there have been described what are at present considered to be the preferred embodiment thereof the scope of the invention is defined only by the appended claims.

What is claimed is:

1. A solid state electron device comprising first and second metal electrodes, said first metal electrode having a relatively low work function and said second metal electrode having a relatively high work function, and a layer of semiconductor material separating said two electrodes, said semiconductor layer having a lower energy band gap at said first electrode than at said second electrode, said energy band gap at any point within said layer being a continuous function of the distance from said first electrode.

2. A solid state device according to claim 1 wherein said semiconducting material is a substitutional solid solution of zinc-cadmium sulfide.

3. A solid state electron device comprising first, second and third conductive electrodes, a first layer of semiconducting material separating said first and second electrodes, a second layer of semiconducting material separating said second and third electrodes, said first semiconducting layer having a different energy band gap at said second electrode than at said first electrode, said band gap within said first layer being a continuous function of the distance from said second electrode toward said first electrode, said second electrode being substantially transparent to hot electrons.

4. A solid state electron device as in claim 3 wherein said second electrode is composed of a mteal and has a thickness less than the mean free path of an electron therein.

5. A solid state electron device comprising first, second and third metal electrodes, a first layer of zinc-cadmium sulfide separating said first and second electrodes, a second layer of zinc-cadmium sulfide separating said second and third electrodes, said first layer having a higher energy band gap at said second electrode than at said first electrode, said energy band gap within said first layer being a continuous function of the distance from said second electrode toward said first electrode, said second electrode having a thickness less than the mean free path therein of an electron.

6. A solid state electron device comprising first, second and third conductive electrodes, a first layer of a substitutional solid solution of zinc-cadmium sulfide separating said first and second electrodes, a second layer of a substitutional solid solution of zinc-cadmium sulfide separating said second and third electrodes, said first layer having a higher percentage of zinc sulfide at said second electrode than at said first electrode, the percentage of zinc sulfide within said first layer being a continuous function of the distance from said second electrode toward said first electrode, said second electrode having a thickness less than the mean free path of an electron therein.

7. A solid state electron device according to claim 2 wherein the amount of zinc sulfide in said layer varies from approximately zero percent at said first electrode to between approximately 5% to approximately 30% at said second electrode.

8. A solid state electron device according to claim 2 wherein siad first electrode is formed of indium and said second electrode is formed of gold.

9. A solid state electron device according to claim 3, wherein said first semiconducting layer has an energy band gap which is lower at said first electrode than at said second electrode and varies monotonically therebetween, and wherein said second semiconducting layer has an energy band gap which is higher at said second electrode than at said third electrode and varies monotonically therebetween.

References Cited by the Examiner

UNITED STATES PATENTS

| | | | |
|---|---|---|---|
| 1,877,140 | 9/1932 | Lilienfeld. | |
| 2,961,475 | 11/1960 | Sommers | 136—4 |
| 3,184,636 | 5/1965 | Dore | 315—4 |

FOREIGN PATENTS

| | | |
|---|---|---|
| 1,287,954 | 2/1962 | France. |

OTHER REFERENCES

Handbook of Chemistry and Physics, Chemical Rubber Publishing Co., Cleveland, Ohio, 1963.

JOHN W. HUCKERT, *Primary Examiner.*

M. EDLOW, *Assistant Examiner.*